United States Patent
Yagi et al.

(10) Patent No.: US 6,249,272 B1
(45) Date of Patent: Jun. 19, 2001

(54) IMAGE PROCESSING METHOD AND DEVICE

(75) Inventors: Hiroshi Yagi; Keisuke Yasui, both of Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/702,191

(22) Filed: Aug. 23, 1996

Related U.S. Application Data

(63) Continuation of application No. 08/315,334, filed on Sep. 30, 1994, now abandoned.

(30) Foreign Application Priority Data

Sep. 30, 1993 (JP) .................................................. 5-244775

(51) Int. Cl.[7] .................................................. G09G 5/36
(52) U.S. Cl. ........................... 345/138; 345/136; 345/429
(58) Field of Search .................................. 345/136, 138, 345/137, 429, 431, 432; 382/300

(56) References Cited

U.S. PATENT DOCUMENTS

| | | | | |
|---|---|---|---|---|
| 3,789,386 | * | 1/1974 | Itoh ....................................... | 345/138 |
| 4,023,165 | * | 5/1977 | Holt ...................................... | 345/138 |
| 4,630,307 | * | 12/1986 | Cok ....................................... | 345/138 |
| 4,823,287 | * | 4/1989 | Thompson ............................ | 345/138 |
| 4,843,380 | * | 6/1989 | Oakley et al. . | |
| 4,918,626 | * | 4/1990 | Watkins et al. . | |
| 5,570,436 | * | 10/1996 | Fukushima et al. ................. | 382/300 |
| 5,668,940 | * | 9/1997 | Steiner et al. ....................... | 345/429 |

* cited by examiner

*Primary Examiner*—Kent Chang
(74) *Attorney, Agent, or Firm*—Dickstein, Shapiro Morin & Oshinsky

(57) ABSTRACT

An image processing method and device corrects an empty dot between Polygons on a video screen at high speed without unnecessarily deforming a shape of the Polygons. Three latches 10, 12, 14 are provided, and a pattern detecting and correcting circuit 30 is inserted between the latches 12, 14. Data of a dot is inputted from the latch 10 and shifted to the right in synchronization with clocks. The pattern detecting and correcting circuit 30 checks a pattern of presence of image data of the continuous four dots along a scan line, based on fill data of the dot data D1, D2, D3, D4, and corrects the inputted dot data D3 to dot data D3' as required to output the corrected dot data D3' to the latch 14.

11 Claims, 7 Drawing Sheets

HOLE

IMAGE PROCESSING METHOD AND DEVICE

This application is a continuation of application Ser. No. 08/315,334, filed Sep. 30, 1994, now abandoned.

BACKGROUND OF THE INVENTION

The present invention relates to an image processing method and device for representing data of respective dots on a screen by image data in a plurality of polygons.

In video game devices, etc., it is necessary to dynamically display a number of objects, such as characters, etc., on backgrounds on video screens. Each object is represented by a polyhedron. Each polygonal element constituting the object is called Polygon. A polygon is defined as a closed plane figure bounded by straight-line segments (sides) intersecting a points called vertices. Polygons of 3, 4, 5, 6, 7, 8, 10 and 12 sides are called, respectively, triangles, quadrilaterals, pentagons, hexagons, heptagons, octagons, decagons, and dodecagons. Video screens are constituted by superposing image data in a plurality of polygons on backgrounds.

A video screen is constituted by a number of dots. Image data in Polygons are written in respective dots in an area for an object to be displayed. Each Polygon is constituted by coordinate values, and image data, such as color data, etc., of each summit of a polygonal plane of the Polygon. Coordinate values of each summit define an area to be written in, and image data, such as color data, etc., are written in dots of the area. Each object is displayed by combinations of a plurality of Polygons.

But because a video screen is constituted by dots, when superposed errors due to quantization, such as location computation, etc., empty portions between Polygons which are intended to connected with each other occur. For example in FIG. 1A, a one-dot gap due to errors in location computation, etc. is present between Polygons X and Y to be correctly connected with each other; and when a video screen is horizontally scanned, as shown in FIG. 1B, empty dots (holes) without image data is present between the Polygons X and Y.

To prevent occurrences of such empty dots between Polygons, conventionally respective Polygons are enlarged by one dot; usually Polygons are superposed on each other at adjacent portions thereof, so that no empty dots take place at worst at the connection therebetween.

But it has been a problem that conventionally all Polygons are enlarged, the processing for which needs an extra time. Another problem is that enlarging one dot adversely deforms a shape of all Polygons. Further another problem is all Polygons are enlarged, with the result that an extra time is needed to transmit image data in Polygons.

SUMMARY OF THE INVENTION

An object of the present invention is to provide an image processing method and device which can correct empty dots between Polygons on a scene at high speed without unnecessary amendment of a shape of Polygons.

The above-described object is achieved by an image processing method for forming data of respective dots on a screen by image data in a plurality of polygons, the method comprising the steps of: sequentially latching data of a plurality of continuous dots in a direction of scanning the screen; and when there is an empty dot without the image data of the polygon in the latched plural dots, amending the image data of the empty dot by the image data of the adjacent dots, based on a pattern of presence of the image data of the plural dots adjacent to the empty dot.

The above-described object is achieved by an image processing method for forming data of respective dots on a screen with data in a plurality of polygons, the method comprising the steps of: sequentially latching data of a plurality of continuous dots in a direction of scanning the screen; and amending the data of the plural dots to data having a preset pattern when the data of the latched plural dots have a specific pattern.

The above-described object is achieved by an image processing device for forming data of respective dots on a screen by image data of a plurality of polygons, the device comprising: latch means for sequentially latching data of a plurality of continuous dots in a direction of scanning the screen; and amending means for, when there is an empty dot without the image data of the polygon in the latched plural dots by the latch means, correcting the image data of the empty dot by the image data of the adjacent dots, based on a pattern of presence of the image data of the plural dots adjacent to the empty dot.

The above-described object is achieved by an image processing device for forming data of respective dots on a screen by image data of a plurality of polygons, the device comprising: latch means for sequentially latching data of a plurality of continuous dots in a direction of scanning the screen; pattern storing means for storing a specific pattern of the data of the plural dots; and pattern correcting means for, when the latched data of the plural dots by the latch means are detected to be the specific pattern, correcting the data of the plural dots to a preset pattern.

The above-described object is achieved by an image processing device for forming data of respective dots on a screen by image data of a plurality of polygons, the device comprising: a first latch for receiving data of a first dot, and latching data of a second dot adjacent to the data of the first dot; a second latch for receiving the data of the second dot and latching data of a third dot adjacent to the data of the second dot; a third latch for receiving the data of the third dot and latching data of a fourth dot adjacent to the data of the third dot; a pattern table for storing a specific pattern of the data of the first dot, the data of the second dot, the data of the third dot, and the data of the fourth dot; and a pattern detecting and correcting circuit inserted between the second and the third latches for, when the data of the first dot, the data of the second dot, the data of the third dot and the data of the fourth dot have the specific pattern registered in the pattern table, correcting the data of the third dot to be outputted from the second latch and outputting the corrected data of the third dot to the third latch.

In the above-described image processing device, it is preferable that the specific pattern indicates that the image data are present in the first and the second and the fourth dots, and the image data is absent in the third dot; and that the pattern detecting and correcting circuit, when the data of the first to the fourth dots agree with the specific pattern, corrects the data of the third dot to the image data of the second dot or the image data of the fourth dot.

The above-described object is achieved by an image processing device for forming data of respective dots on a screen by image data of a plurality of polygons, the device comprising: a first latch for receiving data of a first dot and latching data of a second dot adjacent to the data of the first dot; a second latch for receiving the data of the second dot and latching data of a third dot adjacent to the data of the second dot; a pattern table storing a specific pattern of the data of the first dot, the data of the second dot, the data of the third dot; and a pattern detecting and correcting circuit inserted between the first and the second latches for, when the data of the first dot, the data of the second dot and the data of the third dot have the specific pattern registered in the pattern table, correcting the data of the second dot to be outputted from the second latch and outputting the corrected data of the second dot to the second latch.

In the above-described image processing device, it is preferable that the specific pattern of the pattern table indicates a pattern in which the image data is present in the first dot and the third dot, and the image data is absent in the second dot; and that the pattern detecting and correcting circuit, when the data of the first to the third dots agree with the specific pattern, corrects the data of the second dot to the image data of the first dot or the image data of the third dot.

The above-described object is achieved by an image processing device for forming data of respective dots on a screen by image data of a plurality of polygons, the device comprising: an n number of latches for latching data of continuous an n number of dots in a scanning direction of scan on the screen; a pattern table registering a specific pattern of the data of the n number of dots; and a pattern detecting and correcting circuit for, when the data of the n number of dots have the specific pattern registered in the pattern table, correcting the data of the dot latched by a specific one of the n number of latches to the data of its adjacent dot.

In the above-described image processing device, it is preferable that the specific pattern of the pattern table indicates a mesh pattern having discontinuity; and the pattern detecting and correcting circuit corrects the discontinuity of the mesh pattern.

According to the present invention, data of a plurality of continuous dots are sequentially latched in a direction of scanning a screen, and when empty dots without image data in Polygons are present in the plural dots, image data of the empty dots are corrected to those of adjacent ones of the plural dots, based on a pattern of image data in Polygons of those of the plural dots adjacent to the empty dots, so that the empty dots between Polygons on the screen can be corrected at high speed without unnecessary amendment of a shape of the Polygons.

DETAILED DESCRIPTION OF THE INVENTION

Figure 1A:
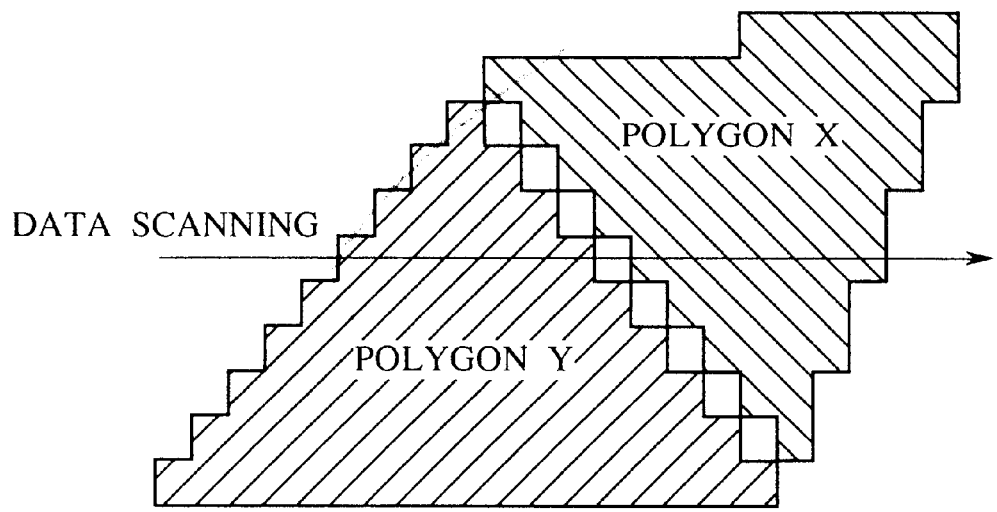
FIGS. 1A and 1B are views of an example of an image with empty dots between Polygons.
Figure 1B:
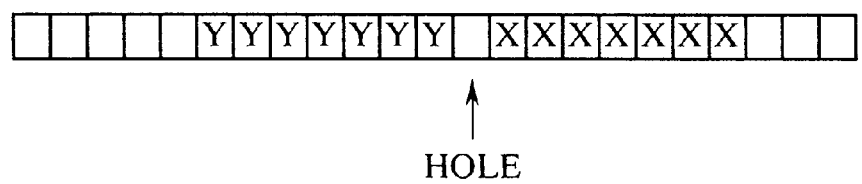
Figure 2:
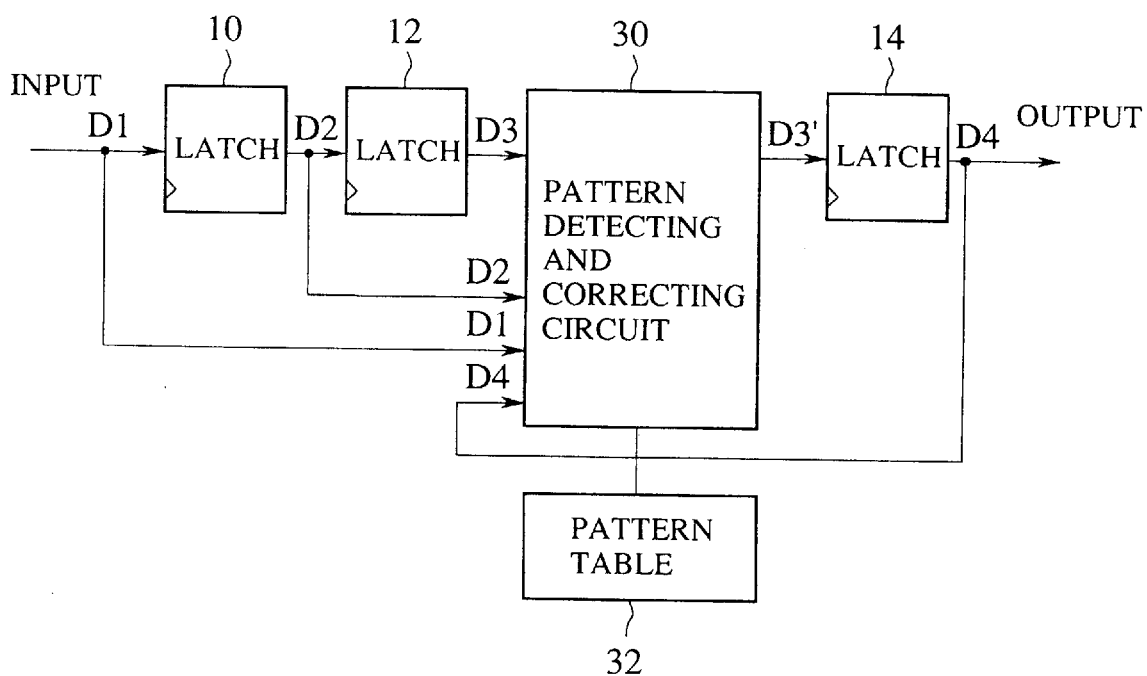
FIG. 2 is a block diagram of the image processing device according to a first embodiment of the present invention.

The image processing device according to a first embodiment of the present invention will be explained with reference to FIGS. 2 and 3.

The image processing device according to the first embodiment includes three latches 10, 12, 14. and a pattern detecting and correcting circuit 30 is inserted between the latches 12, 14.

Original data of dots continued along a direction of scanning a video screen is inputted to the most left latch 10 and sequentially shifted to the right in synchronization with a clock. Dot data corrected by the pattern detecting and correcting circuit 30 are sequentially outputted from the most right latch 14. The pattern detecting and correcting circuit 30 stores a pattern table 32 storing patterns to be detected.

Dot data inputted to the latch 10 is denoted by D1; dot data outputted from the latch 10, D2; dot data outputted from the latch 12, D3; dot data outputted from the pattern detecting and correcting circuit 30, D3'; and dot data outputted from the latch 14; D4.

These dot data D1, D2, D3, D3', D4 each include fill data indicating image data have been written in dots, and image data, such as color data indicative of colors of the dots, etc.

The pattern detecting and correcting circuit 30 detects patterns indicative of presence of image data of 4 continuous dots along a scan line, based on fill data of the dot data D1, D2, D3, D4 to correct inputted dot data D3 as required, and outputs the dot data D3 as corrected dot data D3'.

The pattern detection and amendment of the pattern detecting and correcting circuit 30 will be detailed with reference to FIG. 3. In FIG. 3, image data are indicated in the upper rows of the bit data D1, D2, D3, D4, and the fill data are indicated in the lower rows thereof. The image data indicate kinds (X, Y) of Polygons. The fill data indicate presence of image data by "O" and absence thereof by "X".

The pattern detecting and correcting circuit 30 checks, when the fill data of intended dot data D3 indicates absence of image data "X", patterns of the fill data of the adjacent dot data D1, D2, D3, D4 including the dot data D3.

Figure 3:
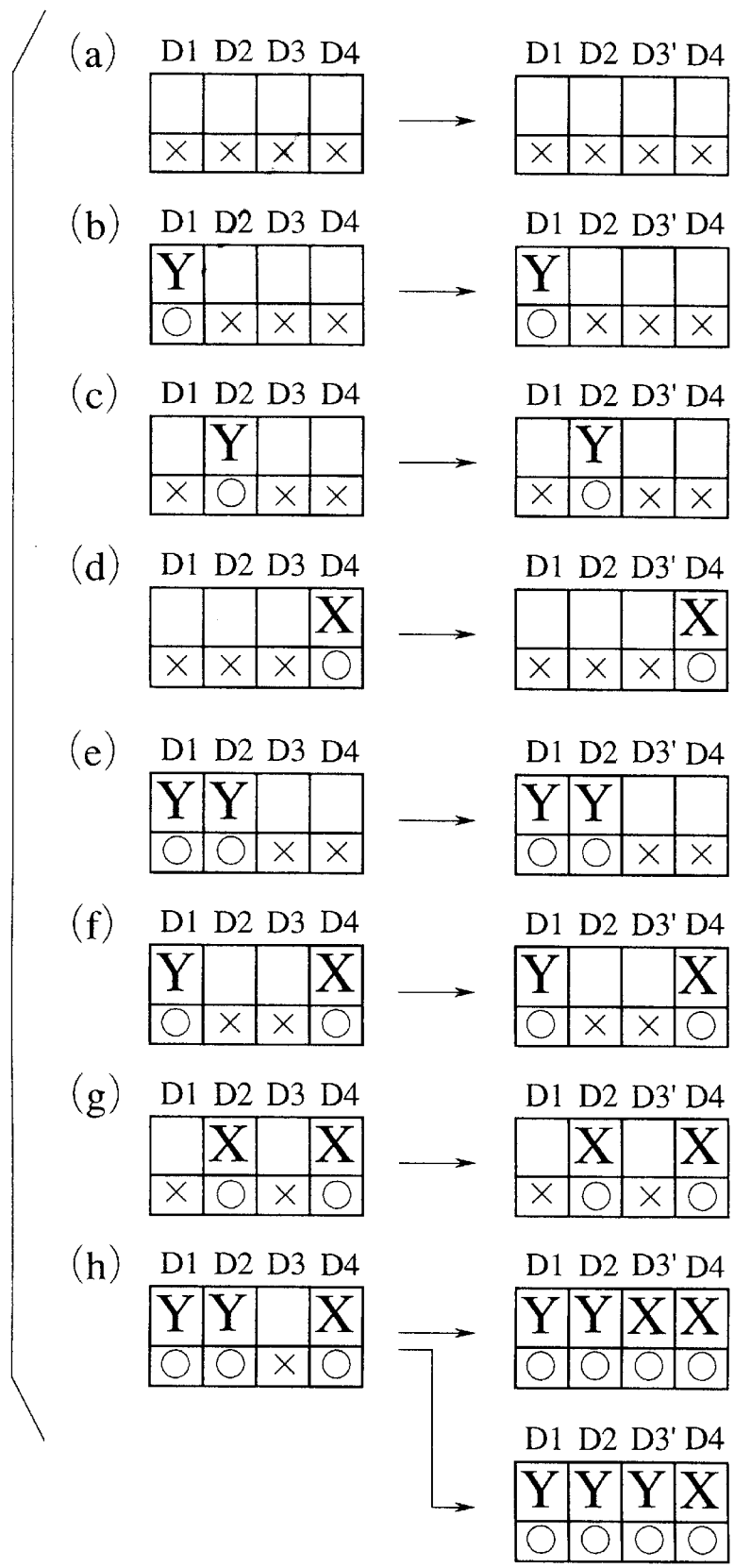
FIG. 3 is an explanatory view of an operation of the image processing device according to the first embodiment of the present invention.

When the fill data of the dot data D3 is "X", patterns of the fill data of the dot data D1, D2, D3, D4 are as shown in FIG. 3. That is, there are cases (a) "XXXX", (b) "OXXX", (c) "XOXX", (d) "XXXO", (e) "OOXX", (f) "OXXO", (g) "XOXO" and (h) "OOXO".

In this embodiment, in the cases (a)–(f) of FIG. 3, two or more empty dots are continued. The dot data D3 is outputted to the latch 24 as the dot data D3' as it is without amendment.

In the case (g) of FIG. 3, empty dots occur every two dots, which is judged to be a mesh pattern indicative of an opaque image in which image data is written in every dot. The dot data D3 is outputted to the latch 14 as the dot data D3' as it is without amendment.

In the case (h) of FIG. 3, empty dot is isolated by one dot, which is judged not to be the above-described mesh pattern, but a hole between Polygons X, Y. The dot data D3 is corrected to the dot data D2 or D4 and outputted as the dot data D3' to the latch 14.

Thus according to the first embodiment, in the case of a hole between Polygons judged based on a pattern of the fill data, the dot data is corrected to adjacent Polygon data, and no amendments are made in the cases of other patterns of the fill data, such as a mesh pattern, etc. Accordingly Polygon data can be corrected without correcting a shape of other Polygons. Furthermore, a Polygon is merely corrected to image data of an adjacent dot as required, based on a pattern of presence of image data of Polygons of data of a plurality of continuous dots, so that empty dots between Polygons can be corrected at high speed by a simple circuit.

Figure 4:
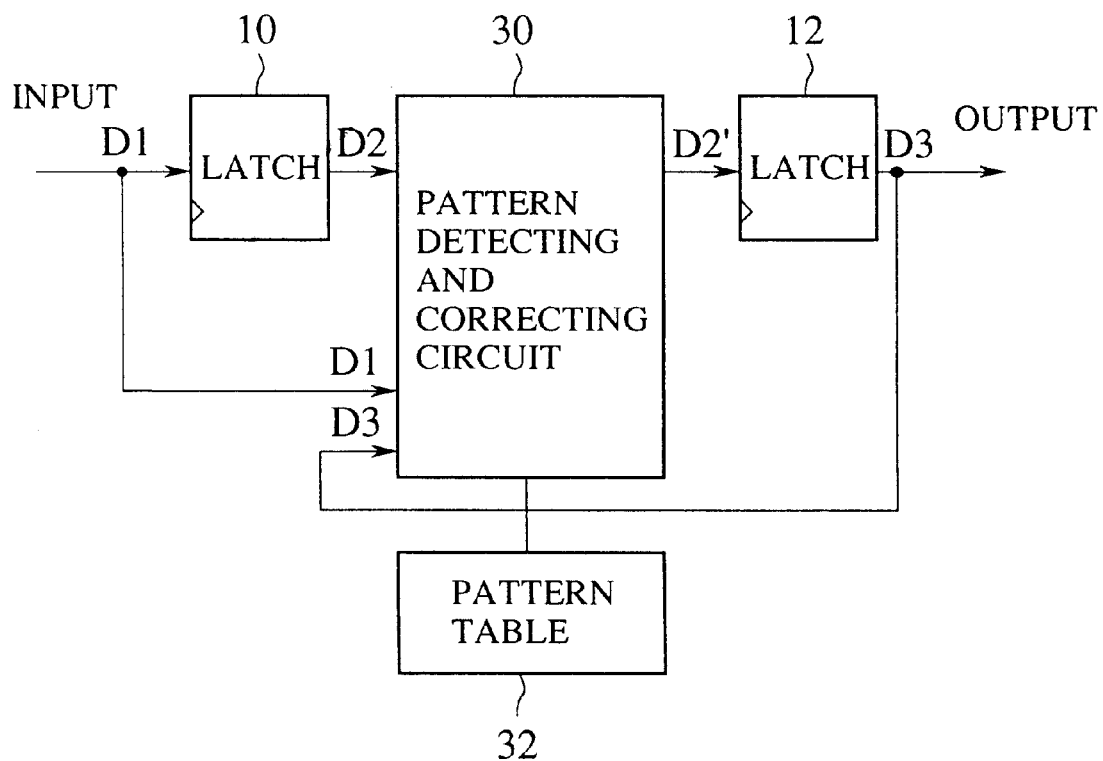
FIG. 4 is a block diagram of the image processing device according to a second embodiment of the present invention.

The image processing device according to a second embodiment of the present invention will be explained with reference to FIGS. 4 and 5. The second embodiment is based upon the assumption that the above-described mesh pattern is not used.

The image processing device according to this embodiment uses two latches 10, 12. A pattern detecting and correcting circuit 30 is inserted between the latches 10, 12.

Original data of dots continued along a direction of scanning a video screen is inputted to the left latch 10 and sequentially shifted to the right in synchronization with a clock. Dot data corrected by the pattern detecting and correcting circuit 30 are sequentially outputted from the right latch 12. The pattern detecting and correcting circuit 30 stores a pattern table 32 storing patterns to be detected.

Dot data inputted to the latch 10 is denoted by D1; dot data outputted from the latch 20, D2; dot data outputted from the pattern detecting and correcting circuit 30, D2'; and dot data outputted from the latch 12, D3.

The dot data D1, D2, D2', D3 includes fill data indicating whether or not image data have been written dots, and image data, such as color data indicating of dot colors, etc.

The pattern detecting and correcting circuit 30 detects patterns indicating of presence of image data of 3 continuous dots along a scan line, based on fill data of the dot data D1, D2, D3 to correct inputted dot data D2 as required, and outputs the dot data D2 as corrected dot data D2'.

The pattern detection and amendment of the pattern detecting and correcting circuit 30 will be detailed with reference to FIG. 5. In FIG. 5, image data are indicated in the upper rows of the bit data D1, D2, D3, and the fill data are indicated in the lower rows thereof.

The pattern detecting and correcting circuit 30 checks, when the fill data of intended dot data D2 indicates absence of image data "X", patterns of the fill data of the adjacent dot data D1, D2, D3 including the dot data D2.

Figure 5:
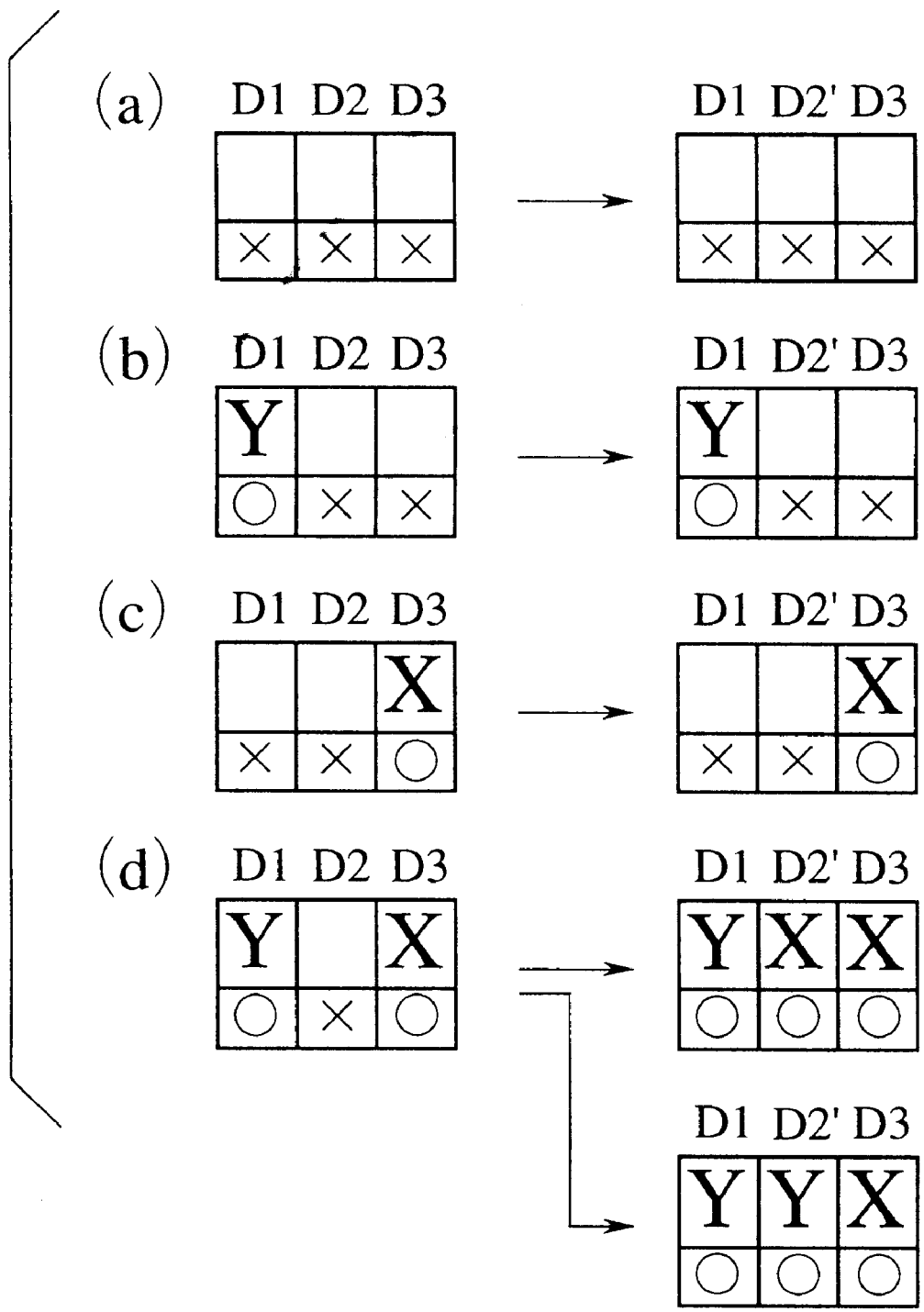
FIG. 5 is an explanatory view of an operation of the image processing device according to the second embodiment of the present invention.

When the fill data of the dot data D2 is "X", patterns of the fill data of the dot data D1, D2, D3 are as shown in the cases (a)–(d) of FIG. 5. That is, there are cases (a) "XXX", (b) "OXX", (c) "XXO", (d) "OXO".

In this embodiment, in the cases (a)–(c) of FIG. 5, two or more empty dots are continued. The dot data D2 is outputted to the latch 14 as the dot data D2' as it is without amendment.

In the case (d) of FIG. 5, one empty dot is isolated. This embodiment does not use a mesh pattern, and the pattern is judged to be a hole between Polygons X, Y. The dot data D2 is corrected to the dot data D1 or D3, and outputs to the latch 14 the dot data D2 as the corrected dot data D2'.

Thus according to the second embodiment, based on a pattern of fill data, in the case of a hole between Polygons, the dot data is corrected to an adjacent Polygon without correcting a shape of the other Polygons, and no amendments are made in cases of the other patterns. Furthermore, a Polygon is merely corrected to image data of an adjacent dot as required, based on a pattern of presence of image data of Polygons of data of a plurality of continuous dots, so that empty dots between Polygons can be corrected at high speed by a simple circuit.

Figure 6:
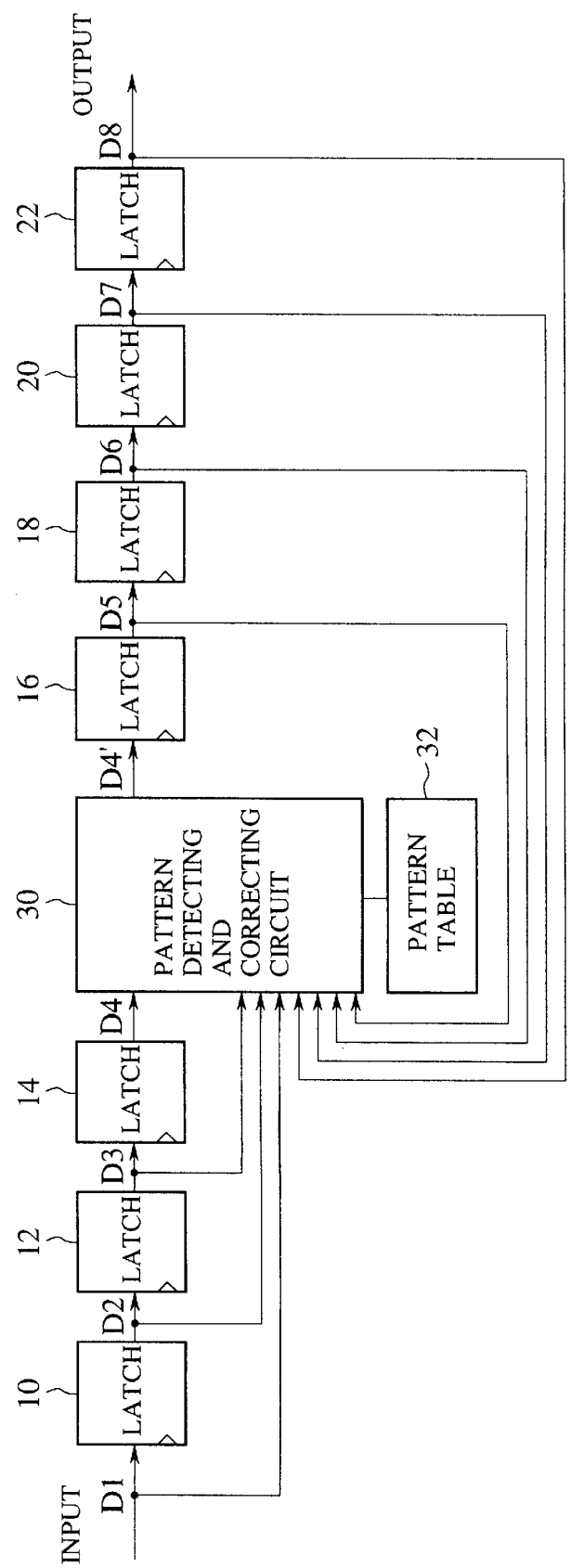
FIG. 6 is a block diagram of the image processing device according to a third embodiment of the present invention.

The image processing device according to a third embodiment of the present invention will be explained with reference to FIGS. 6 and 7. In the third embodiment, data of a larger number of dots are used to detect empty dots between Polygons.

The image processing device according to this embodiment includes 7 latches 10, 12, 14, 16, 18, 20, 22, and a pattern detecting and correcting circuit 30 inserted between the latches 14, 16.

Original data of dots continued along a direction of scanning a video screen is inputted to the most left latch 10 and sequentially shifted to the right in synchronization with a clock. Dot data corrected by the pattern detecting and correcting circuit 30 are inputted to the latch 16. The pattern detecting and correcting circuit 30 stores a pattern table 32 storing patterns to be detected.

Dot data inputted to the latches 10, 12, 14 are indicated by D1, D2, D3, and dot data outputted from the latch 14 is denoted by D4. Dot data outputted from the pattern detecting and correcting circuit 30 are represented by D4', and dot data outputted from the latches 16, 18, 20, 22 are denoted by D5, D6, D7, D8.

The dot data D1–D8 include fill data indicating whether or not image data are written in dots, and image data, such as color data indicating colors of the dots, etc.

The pattern detecting and correcting circuit 30 detects patterns indicative of presence of image data of 8 continuous dots along a scan line, based on fill data of the dot data D1–D8, and when the pattern is a set pattern stored in the pattern table 32, corrects the inputted dot data D4 as required to output to the latch 12 the dot data D4 as the dot data D4'.

An example of detecting and correcting a pattern by the pattern detecting and correcting circuit will be explained with reference to FIG. 7. As in FIG. 3, image data (X,Y) of dot data D1, D2, D3. D4, D5, D6, D7, D8 are shown in the upper row, and fill data thereof are shown in the lower row.

Figure 7:
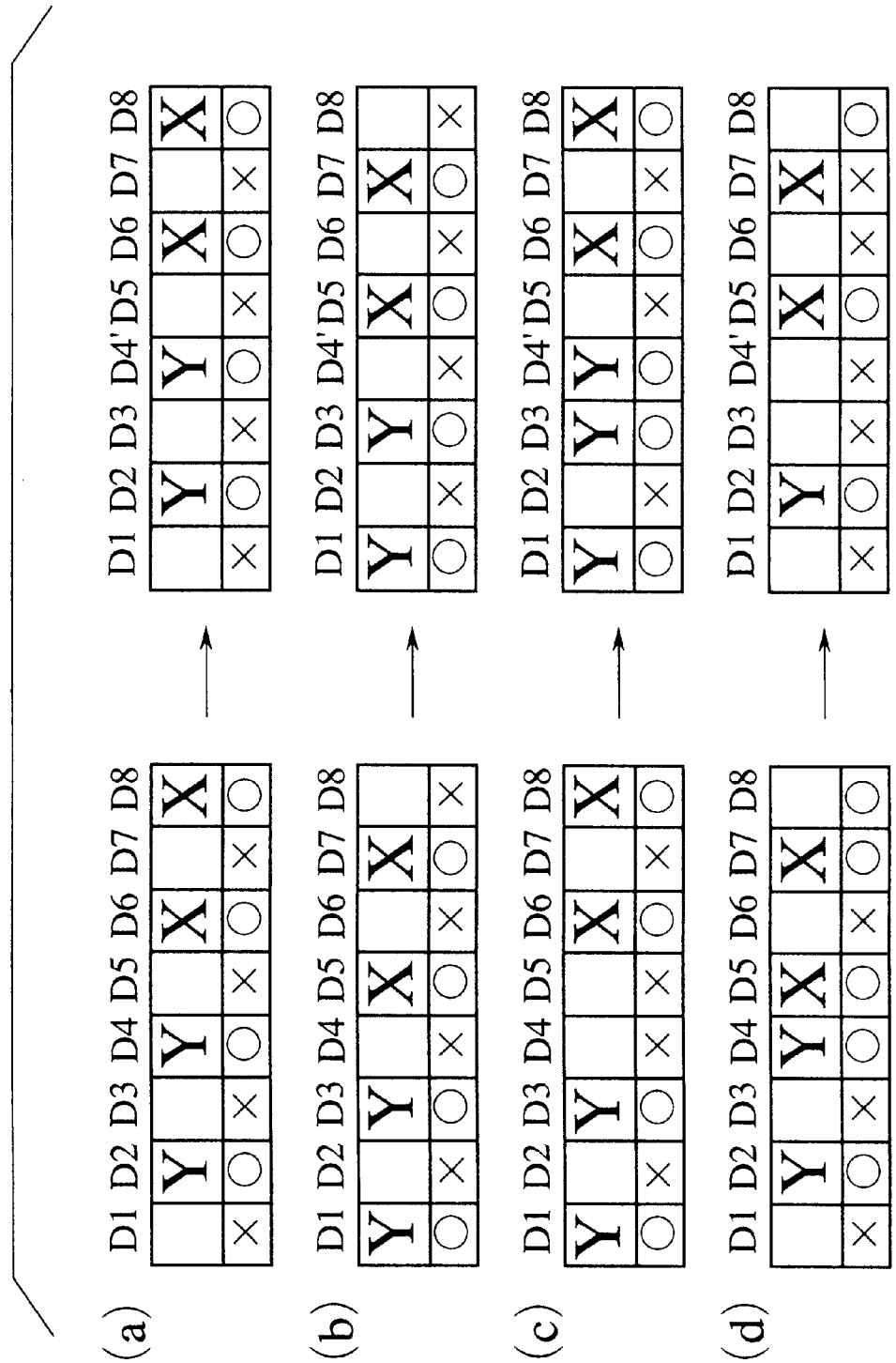
FIG. 7 is an explanatory view of an operation of the image processing device according to the third embodiment of the present invention.

In the example of FIG. 7, discontinuity of the mesh patterns of a Polygon X and a Polygon Y is corrected. In the case (c) of FIG. 7 in which two empty dots occur on the boundary between the mesh patterns of a Polygon X and that of a Polygon Y, and the case (d) of FIG. 7 in which oppositely to the case (c) of FIG. 7 two image data dots continue on the boundary between a Polygon X and a Polygon Y, images have unnatural connections. This example corrects such discontinuous images.

The pattern detecting and correcting circuit 30 detects a pattern of fill data of dot data D1, D2, D3, D4, D5, D6, D7, D8 so as to detect whether or not the fill data have a correct mesh pattern.

Patterns of fill data near the boundary between the mesh patterns of a Polygon X and that of a Polygon Y are as shown in FIG. 7. That is, there are cases (a) "XOXOXOXO", (b) "OXOXOXOX", (c) "OXOXXOXO", and (d) "XOXOOXOX".

In this embodiment, the fill data patterns of the cases (a) and (b) show smooth continuation of the mesh patterns of the Polygons X and Polygons Y, and the dot data D4 is outputted as dot data D4' to the latch 16 as it is without correction.

In the fill data pattern of the case (c), two empty dots continue, and it is judged that the Polygon X and the Polygon Y are interrupted. The dot data D4 is corrected to the adjacent dot data D3 (Y) to be outputted as dot data D4' to the latch 16. Consequently the dot data D4' becomes image data Y.

In the fill data pattern of the case (d), two image data dots continue, and it is judged that the Polygon X and the Polygon Y are interrupted. The dot data D3 (empty) of the dot D3 is corrected to the dot data D4 to be outputted as dot data D4' to the latch 16. Consequently the dot data D4' becomes empty.

Thus according to the third embodiment, in the case that mesh patterns of Polygons are interrupted, dot data of a Polygon is corrected to that of its adjacent dot, based on a pattern of fill data of data of a number of dots, and no corrections are made in the cases of other patterns of the fill data. Thus discontinuity of mesh patterns can be accurately detected and can be suitably corrected. In even using data of a large number of dots, based on a pattern of the dot data, image data of a dot is merely corrected to that of an adjacent dot as required, whereby the discontinuity can be corrected at high speed.

In the above-described embodiments, an empty dot is corrected based on patterns of data of, e.g., 3, 4 and 8 dots, but larger numbers of dots may be used to detect patterns.

The location of the pattern detecting and correcting circuit is not limited to that in the above-described embodiments, and may be inserted immediately before any of the latches.

In the above-described embodiments, patterns of presence of image data are detected based on fill data, but may be detected based on image data, such as color data, etc., or other data as long as it is data indicative of write of image data in Polygons.

What is claimed is:

1. An image processing method for processing image data in the form of dots on a screen, said image data representing a plurality of polygons to be displayed, the method comprising the steps of:

sequentially latching image data in the form of a plurality of continuous dots in a scanning direction of the screen; and detecting a boundary between two of said plurality of polygons to be displayed, and for an empty dot associated with said boundary that has no image data from a polygon associated with it, detecting the plurality of dots adjacent to the empty dot, and generating, if the detected plurality of dots have image data, image data for the empty dot, corresponding to the image data of at least one of the detected dots.

2. An image processing device for processing image data in the form of dots on a screen, said image data representing a plurality of polygons to be displayed, the device comprising:

latch means for sequentially latching image data in the form of a plurality of continuous dots in a scanning direction of the screen; and means for detecting a boundary between two of said plurality of polygons to be displayed, and when there is an empty dot associated with said boundary that has no image data from a polygon associated with it, detecting the plurality of dots adjacent to the empty dot, and generating, if the detected plurality of dots have image data, image data for the empty dot, corresponding to the image data of at least one of the detected dots.

3. An image processing device for processing image data in the form of dots to be displayed on a screen, said image data representing a plurality of polygons to be displayed, the device comprising:

a first latch for receiving image data of a first dot, and latching image data of a second dot adjacent to the image data of the first dot;

a second latch for receiving the image data of the second dot and latching image data of a third dot adjacent to the image data of the second dot;

a third latch for receiving the image data of the third dot and latching image data of a fourth dot adjacent to the image data of the third dot;

a pattern memory table for storing a specific pattern of image data corresponding to a boundary between two polygons; and a pattern detecting and correcting circuit inserted between the second and the third latches for, when a pattern of image data comprising the image data of the first dot, the image data of the second dot, the image data of the third dot and the image data of the fourth dot have the specific pattern of image data corresponding to the boundary between two polygons registered in the pattern table, correcting the image data of the third dot and outputting the corrected image data of the third dot to the third latch.

4. The image processing device according to claim 3, wherein the specific pattern of the pattern table indicates a pattern in which the image data are present in the first and the second and the fourth dots, and the image data is absent in the third dot;

the pattern detecting and correcting circuit, when the data of the first to the fourth dots agree with the specific pattern, corrects the data of the third dot to the image data of the second dot or the image data of the fourth dot.

5. An image processing device for processing image data in the form of dots to be displayed on a screen, said image data representing a plurality of polygons to be displayed, the device comprising:

a first latch for receiving image data of a first dot, and latching image data of a second dot adjacent to the image data of the first dot;

a second latch for receiving the image data of the second dot and latching image data of a third dot adjacent to the image data of the second dot;

a pattern memory table for storing a specific pattern of image data corresponding to a boundary between two polygons; and a pattern detecting and correcting circuit inserted between the first and the second latches for, when a pattern of image data comprising the image data of the first dot, the image data of the second dot, and the image data of the third dot have the specific pattern of image data corresponding to the boundary between two polygons registered in the pattern table, correcting the image data of the second dot and outputting the corrected image data of the second dot to the second latch.

6. An image processing device according to claim 5, wherein the specific pattern of the pattern table indicates a pattern in which the image data is present in the first dot and the third dot, and the image data is absent in the second dot; and the pattern detecting and correcting circuit, when the data of the first to the third dots agree with the specific pattern, corrects the image data of the second dot to the image data of the first dot or the image data of the third dot.

7. An image processing device as claimed in claim 3 wherein the pattern detecting and correcting circuit corrects the image data of the third dot by generating corrected image data for the third dot corresponding to one of the two polygons.

8. An image processing device for processing image data in the form of dots to be displayed on a screen, said image data representing a plurality of polygons to be displayed, the device comprising:

a first latch for receiving image data of a first dot, and latching image data of a second dot adjacent to the image data of the first dot;

a second latch for receiving the image data of the second dot and latching image data of a third dot adjacent to the image data of the second dot;

a third latch for receiving the image data of the third dot and latching image data of a fourth dot adjacent to the image data of the third dot;

a pattern memory table for storing a specific pattern of image data corresponding to a boundary between two polygons; and a pattern detecting and correcting circuit inserted between the first and the second latches for, when a pattern of image data comprising the image data of the first dot, the image data of the second dot, the image data of the third dot and the image data of the fourth dot have the specific pattern of image data corresponding to the boundary between two polygons registered in the pattern table, correcting the image data of the second dot and outputting the corrected image data of the second dot to the second latch.

9. The image processing device according to claim 8, wherein the specific pattern of the pattern table indicates a pattern in which the image data are present in the first and the third and the fourth dots, and the image data is absent in the second dot;

the pattern detecting and correcting circuit, when the data of the first to the fourth dots agree with the specific pattern, corrects the data of the second dot to the image data of the first dot or the image data of the third dot.

10. An image processing device according to claim 8, wherein the pattern memory table stores another pattern of image data corresponding to a mesh pattern in which image data is written in every dot, the pattern detecting and correcting circuit detects the another pattern of image data corresponding to the mesh pattern, which is distinguishable from the specific pattern of image data corresponding to the boundary between two polygons, and outputs the image data without correction.

11. An image processing device according to claim 3, wherein the pattern memory table stores another pattern of image data corresponding to a mesh pattern in which image data is written in every dot, the pattern detecting and correcting circuit detects the another pattern of image data corresponding to the mesh pattern, which is distinguishable from the specific pattern of image data corresponding to the boundary between two polygons, and outputs the image data without correction.

* * * * *